US012718058B2

(12) United States Patent
Yuan et al.

(10) Patent No.: US 12,718,058 B2
(45) Date of Patent: Aug. 25, 2026

(54) HYBRID NEURAL NETWORK ARCHITECTURE WITHIN CASCADING PIPELINES

(71) Applicant: NVIDIA Corporation, Santa Clara, CA (US)

(72) Inventors: Wind Yuan, Shanghai (CN); Kaustubh Purandare, San Jose, CA (US); Bhushan Rupde, Pune (IN); Shaunak Gupte, Dombivli (IN); Farzin Aghdasi, East Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 943 days.

(21) Appl. No.: 17/116,229

(22) Filed: Dec. 9, 2020

(65) Prior Publication Data

US 2021/0334629 A1 Oct. 28, 2021

Related U.S. Application Data

(60) Provisional application No. 63/015,486, filed on Apr. 25, 2020.

(51) Int. Cl.

| | |
|---|---|
| ***G06N 3/045*** | (2023.01) |
| ***G06N 3/08*** | (2023.01) |
| ***G06N 3/10*** | (2006.01) |

(52) U.S. Cl.

CPC ............... *G06N 3/045* (2023.01); *G06N 3/08* (2013.01); *G06N 3/10* (2013.01)

(58) Field of Classification Search

CPC G06N 3/045; G06N 3/08; G06N 3/10; G06N 3/063

See application file for complete search history.

(56) References Cited

U.S. PATENT DOCUMENTS

| | | | |
|---|---|---|---|
| 8,284,258 B1 | 10/2012 | Cetin et al. |
| 9,235,766 B2 | 1/2016 | Li et al. |

(Continued)

FOREIGN PATENT DOCUMENTS

| | | |
|---|---|---|
| WO | 2012/001947 A1 | 1/2012 |
| WO | 2019/070535 A1 | 4/2019 |

OTHER PUBLICATIONS

Ben-Nun, Tal, et al. "A modular benchmarking infrastructure for high-performance and reproducible deep learning." 2019 IEEE International Parallel and Distributed Processing Symposium (IPDPS). IEEE, 2019. (Year: 2019).*

(Continued)

*Primary Examiner* — Henry Nguyen

(74) *Attorney, Agent, or Firm* — IRON SUMMIT IP LLP

(57) ABSTRACT

A multi-stage multimedia inferencing pipeline may be set up and executed using configuration data including information used to set up each stage by deploying the specified or desired models and/or other pipeline components into a repository (e.g., a shared folder in a repository). The configuration data may also include information a central inference server library uses to manage and set parameters for these components with respect to a variety of inference frameworks that may be incorporated into the pipeline. The configuration data can define a pipeline that encompasses stages for video decoding, video transform, cascade inferencing on different frameworks, metadata filtering and exchange between models and display. The entire pipeline can be efficiently hardware-accelerated using parallel processing circuits (e.g., one or more GPUs, CPUs, DPUs, or TPUs). Embodiments of the present disclosure can integrate an entire video/audio analytics pipeline into an embedded platform in real time.

21 Claims, 9 Drawing Sheets

(56) References Cited

U.S. PATENT DOCUMENTS

| | | | |
|---|---|---|---|
| 9,449,216 B1 | 9/2016 | Dhua et al. | |
| 9,623,905 B2 | 4/2017 | Shashua et al. | |
| 10,365,658 B2 | 7/2019 | Fridman | |
| 10,810,445 B1 * | 10/2020 | Kangaspunta | G06T 5/50 |
| 10,824,909 B2 | 11/2020 | Ros Sanchez et al. | |
| 10,834,127 B1 * | 11/2020 | Yeh | G06N 20/00 |
| 10,861,170 B1 | 12/2020 | Li et al. | |
| 10,996,069 B2 | 5/2021 | Qiao et al. | |
| 11,104,269 B2 | 8/2021 | Karol | |
| 11,216,888 B2 | 1/2022 | Perl et al. | |
| 11,797,875 B1 * | 10/2023 | Gao | G06Q 30/0242 |
| 2013/0325787 A1 | 12/2013 | Gerken et al. | |
| 2014/0071287 A1 | 3/2014 | Tu et al. | |
| 2014/0132786 A1 | 5/2014 | Saitwal et al. | |
| 2015/0086071 A1 | 3/2015 | Wu et al. | |
| 2015/0131851 A1 | 5/2015 | Bernal et al. | |
| 2015/0145995 A1 | 5/2015 | Shahraray et al. | |
| 2015/0266421 A1 | 9/2015 | Brubaker | |
| 2016/0125621 A1 | 5/2016 | Saitwal et al. | |
| 2016/0275801 A1 | 9/2016 | Kopardekar | |
| 2016/0277646 A1 | 9/2016 | Carr et al. | |
| 2016/0307047 A1 | 10/2016 | Krishnamoorthy et al. | |
| 2017/0256165 A1 | 9/2017 | Pennington et al. | |
| 2018/0096595 A1 | 4/2018 | Janzen et al. | |
| 2018/0134215 A1 | 5/2018 | Kim et al. | |
| 2018/0232584 A1 | 8/2018 | Pathangay et al. | |
| 2019/0034794 A1 | 1/2019 | Ogale et al. | |
| 2019/0101924 A1 | 4/2019 | Styler et al. | |
| 2019/0141340 A1 * | 5/2019 | Reddiar | H04N 19/136 |
| 2019/0324745 A1 * | 10/2019 | Chandra | G06F 8/453 |
| 2019/0392345 A1 * | 12/2019 | Adaska | G06N 5/04 |
| 2020/0004597 A1 * | 1/2020 | Sengupta | G06N 3/08 |
| 2020/0021873 A1 * | 1/2020 | Swaminathan | H04N 21/466 |
| 2020/0169662 A1 | 5/2020 | Wananabe et al. | |
| 2020/0219291 A1 * | 7/2020 | Kim | G06T 5/70 |
| 2020/0225317 A1 * | 7/2020 | Chen | G01S 7/417 |
| 2020/0319919 A1 * | 10/2020 | Che | G06F 11/3612 |
| 2020/0342290 A1 * | 10/2020 | Carothers | G06N 3/063 |
| 2020/0361482 A1 | 11/2020 | Choi et al. | |
| 2020/0403912 A1 * | 12/2020 | Allen | H04L 47/822 |
| 2021/0012236 A1 * | 1/2021 | Carrasco | G06N 3/08 |
| 2021/0064431 A1 * | 3/2021 | Smith | G06F 9/542 |
| 2021/0074425 A1 * | 3/2021 | Carter | G06N 20/00 |
| 2021/0096264 A1 * | 4/2021 | Bosse | G01S 7/4802 |
| 2021/0201128 A1 * | 7/2021 | Xu | G06F 16/254 |
| 2022/0053071 A1 * | 2/2022 | Murphy | G06N 20/00 |
| 2022/0138596 A1 * | 5/2022 | Kumar | G06T 1/20<br>706/45 |
| 2023/0050882 A1 * | 2/2023 | Shalai | G06F 16/9574 |
| 2023/0105476 A1 * | 4/2023 | Anil | G06N 3/006<br>718/102 |

OTHER PUBLICATIONS

Goodwin, David. "NVIDIA Triton Inference Server Boosts Deep Learning Inference." NVIDIA Developer Blog. Sep. 12, 2018. Retrieved from the internet on Sep. 10, 2020 from URL <https://developer.nvidia.com/blog/nvidia-serves-deep-learning-inference/>.

Dai, B, et al,. "Detecting visual relationships with deep relational networks." Proceedings of the IEEE Conference on Computer Vision and Pattern Recognition (CVPR), pp. 3076-3086 (2017).

Dai, J., et al., "Convolutional Feature Masking for Joint Object and Stuff Segmentation", IEEE Conference on Computer Vision and Pattern Recognition (CVPR), pp. 1-10 (2015).

Fernando, T., et al., "Soft+ hardwired attention: An LSTM Framework for Human Trajectory Prediction and Abnormal Event Detection", Cornell University Library, pp. 1-25 (2017).

Girshick, Ross. "Fast R-CNN." Proceedings of the IEEE International Conference on Computer Vision (ICCV), pp. 1440-1448, 2015.

Gkioxari, G., et al. "Detecting and recognizing human-object interactions." Proceedings of the IEEE Conference on Computer Vision and Pattern Recognition (CVPR), pp. 8359-8367 (2018).

Liao, W, et al., "Natural Language Guided Visual Relationship Detection." In Proceedings of the IEEE Conference on Computer Vision and Pattern Recognition Workshops, pp. 1-10 (2019).

Ling, X., et al., "Identifying parking spaces & detecting occupancy using vision-based IoT devices", IEEE, pp. 1-6 (2017).

Pawar, K., and Attar, V., "Deep learning based detection and localization of road accidents from traffic surveillance videos", ICT Express, pp. 1-9 (2021).

Mao, J, et al. "Generation and comprehension of unambiguous object descriptions." Proceedings of the IEEE conference on computer vision and pattern recognition. pp. 11-20, (2016).

Masmoudi, I., et al., "Multi agent parking lots modelling for anomalies detection while parking", IET Computer Vision, pp. 407-414 (2016).

Xue, H., et al., "Bi-prediction: Pedestrian Trajectory Prediction Based on Bidirectional LSTM classification", IEEE, pp. 1-8 (2017).

Yu, L, et al. "Modeling context in referring expressions." European Conference on Computer Vision. Springer, Cham, pp. 1-19 (2016).

Zhang, J, et al. "Relationship Proposal Networks." Proceedings of the IEEE Conference on Computer Vision and Pattern Recognition (CVPR), vol. 1, pp. 5678-5686 (2017).

Zhang, J, et al., "Large-Scale Visual Relationship Understanding." In Proceedings of the AAAI Conference on Artificial Intelligence, vol. 33, pp. 9185-9194 (2019).

International Search Report and Written Opinion mailed Jun. 26, 2019 in International Patent Application No. PCT/US2019/023924, 10 pages.

Invitation to pay additional fees received for PCT Patent Application No. PCT/US2019/024145, mailed on Jun. 27, 2019, 13 pages.

International Search Report and Written Opinion mailed Aug. 26, 2019 in International Patent Application No. PCT/US2019/024145, 17 pages.

Notification of Transmittal of International Preliminary Report on Patent Ability (Chapter II of the Patent Cooperation Treaty) in International Patent Application No. PCT/US2019/023924 mailed Mar. 4, 2020.

International Search Report and Written Opinion in International Patent Application No. PCT/US2019/060467 mailed Jul. 8, 2020, 15 Pages.

International Preliminary Report on Patentability received for PCT Application No. PCT/US2019/024145, mailed on Oct. 8, 2020, 13 pages.

Non-Final Office Action dated Dec. 18, 2020 in U.S. Appl. No. 16/363,869, 16 pages.

Final Office Action dated Apr. 14, 2021 in U.S. Appl. No. 16/363,869, 21 pages.

Preinterview First Office Action dated May 24, 2021 in U.S. Appl. No. 16/678,100, 4 pages.

International Preliminary Report on Patentability received for PCT Application No. PCT/US2019/060467, mailed on May 27, 2021, 13 pages.

Notice of Allowance dated Jul. 13, 2021, in U.S. Appl. No. 16/365,581, 7 pages.

Non-Final Office Action dated Aug. 13, 2021 in U.S. Appl. No. 16/363,869, 25 pages.

Notice of Allowance dated Aug. 13, 2021, in U.S. Appl. No. 16/678,100, 9 pages.

Final Office Action dated Dec. 7, 2021 in U.S. Appl. No. 16/363,869, 30 pages.

Notice of Allowance dated Feb. 24, 2022, in U.S. Appl. No. 16/363,869, 12 pages.

* cited by examiner

HYBRID NEURAL NETWORK ARCHITECTURE WITHIN CASCADING PIPELINES

CROSS-REFERENCE TO RELATED APPLICATIONS

This application claims the benefit of U.S. Provisional Application No. 63/015,486, filed on Apr. 25, 2020, which is hereby incorporated by reference in its entirety.

The following applications are incorporated by reference in their entireties:

U.S. Provisional Application No. 62/648,339, filed on Mar. 26, 2018, titled "Systems and Methods for Smart Area Monitoring";

U.S. Non-Provisional application Ser. No. 16/365,581, filed on Mar. 26, 2019, titled "Smart Area Monitoring with Artificial Intelligence";

U.S. Provisional Application No. 62/760,690, filed on Nov. 18, 2018, titled "Associating Bags to Owners";

U.S. Non-Provisional application Ser. No. 16/678,100, filed on Nov. 8, 2019, titled "Determining Associations between Objects and Persons Using Machine Learning Models"; and U.S. Non-Provisional application Ser. No. 16/363,869, filed on Mar. 25, 2019, titled "Object Behavior Anomaly Detection Using Neural Networks."

BACKGROUND

As sensors are increasingly being positioned within or about vehicles and along intersections and roadways, more opportunities exist to record and analyze the multimedia information being generated using these sensors. To analyze multimedia (such as video, audio, temperature, etc.) in streaming real-time applications, existing approaches generally use deep learning models to produce or to assist with analysis of data generated by sensors. However, no unified solution has been adopted by the industry at large, and available approaches remain fragmented and often incompatible.

Popular Deep learning frameworks such as Tensorflow, Open Neural Network Exchange (ONNX), PyTorch, Caffe2, and TensorRT dominate the neural network training and inference world. Each deep learning framework has developed its own eco-systems and optimizations for performance in relation to particular tasks. Naturally, there are different pre-trained machine learning models used for inferencing that are based on each of these different frameworks. It is hard to pre-determine which platform may be better than any other at a particular task since each model is defined at runtime. There is no way to convert one model at runtime to another at runtime, due to the different formats and layers that each framework supports. Some frameworks support limited importing and converting of a runtime model of another framework into its runtime. However, users who wish to combine different models in different architectures are required to reject some frameworks due to issues with compatibility.

It may be particularly useful to combine different models arranged into a sequence of different runtimes for inferencing performed on a multimedia pipeline. However, no conventional approaches provide a convenient way for these objectives to be achieved. Known inferencing platforms may include ensemble-mode support for cascade inference. Generally, these solutions focus on inference in particular, but have limited or no support for decoding, processing and cascade preprocessing/post-processing and are very limited for tensor transfer. For example, all video and audio must be decoded and processed externally by the application user with no support for multimedia formats or operations. Further, only raw tensor data may be exchanged between models, introducing potential problems with model compatibility and limiting the ability to customize inputs to different models in the pipeline. The output from these approaches also produce raw tensor data that may be difficult for humans to read and understand, such as for detection, segmentation and classification.

SUMMARY

Embodiments of the present disclosure relate to a hybrid neural network architecture within cascading pipelines. An architecture is described that may integrate an inference server that supports multiple deep learning frameworks and multi-model concurrent execution with a hardware-accelerated platform for streaming video analytics and multi-sensor processing.

In contrast to conventional approaches, disclosed approaches enable a multi-stage multimedia inferencing pipeline to be set up and executed with high efficiency while producing quality results. The inferencing pipeline may be suitable for (but not limited to) edge platforms, including embedded devices. In one or more embodiments, configuration data (e.g., a configuration file) of the pipeline may include information used to set up each stage by deploying the specified or desired models and/or other pipeline components into a repository (e.g., a shared folder in a repository). The configuration data may also include information a central inference server library uses to manage and set parameters for these components with respect to a variety of inference frameworks that may be incorporated into the pipeline. The configuration data can define a pipeline that encompasses stages for video decoding, video transform, cascade inferencing (including, without limitation primary inferencing and multiple secondary inferencing) on different frameworks, metadata filtering and exchange between models and display. In one or more embodiments, the entire pipeline can be efficiently hardware-accelerated using parallel processing circuits (e.g., one or more GPUs, CPUs, DPUs, or TPUs). Embodiments of the present disclosure can integrate an entire video/audio analytics pipeline into an embedded platform in real time.

BRIEF DESCRIPTION OF THE DRAWINGS

The present systems and methods for behavior-guided path planning in autonomous machine applications is described in detail below with reference to the attached drawing figures, wherein.

DETAILED DESCRIPTION

Figure 1A:
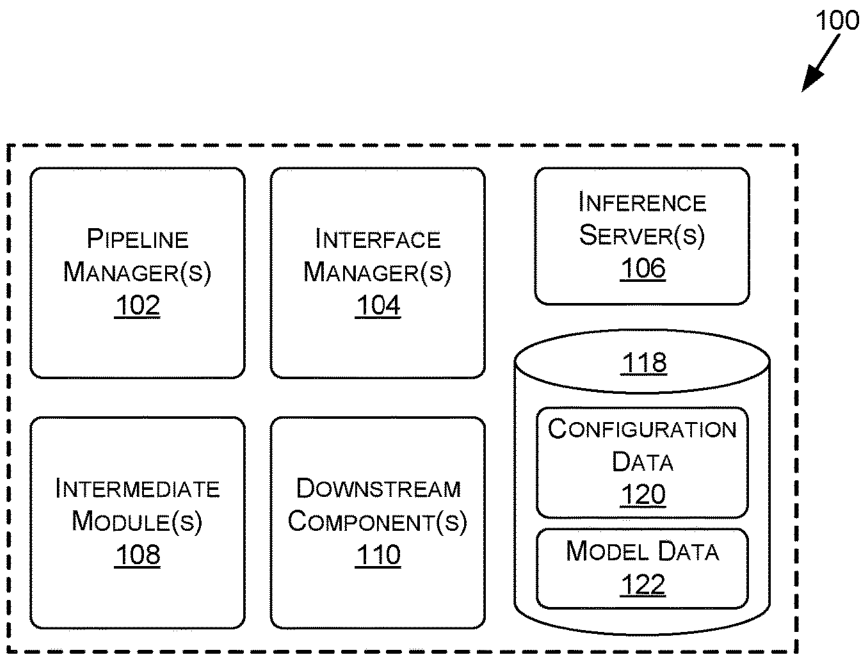
FIG. 1A is a block diagram of an example pipelined inferencing system, in accordance with some embodiments of the present disclosure.

Embodiments of the present disclosure relate to a hybrid neural network architecture within cascading pipelines. An architecture is described that may integrate an inference server that supports multiple deep learning frameworks and multi-model concurrent execution with a hardware-accelerated platform for streaming video analytics and multi-sensor processing.

In contrast to conventional approaches, disclosed approaches enable a multi-stage multimedia inferencing pipeline to be set up and executed with high efficiency while producing quality results. The inferencing pipeline may be suitable for (but not limited to) edge platforms, including embedded devices. In one or more embodiments, configuration data (e.g., a configuration file) of the pipeline may include information used to set up each stage by deploying the specified or desired models and/or other pipeline components into a repository (e.g., a shared folder in a repository). The configuration data may also include information a central inference server library uses to manage and set parameters for these components with respect to a variety of inference frameworks that may be incorporated into the pipeline. The configuration data can define a pipeline that encompasses stages for video decoding, video transform, cascade inferencing (including, without limitation primary inferencing and multiple secondary inferencing) on different frameworks, metadata filtering and exchange between models and display. In one or more embodiments, the entire pipeline can be efficiently hardware-accelerated using parallel processing circuits (e.g., one or more GPUs, CPUs, DPUs, or TPUs). Embodiments of the present disclosure can integrate an entire video/audio analytics pipeline into an embedded platform in real time.

Systems and methods implementing the present disclosure may integrate an inference server that supports multiple frameworks and multi-model concurrent execution, such as the Triton inference server (TRT-IS) developed by NVIDIA Corporation with a multimedia and TensorRT-based inference pipeline, such as DeepStream, also developed by NVIDIA Corp. This design is able to achieve highly efficient performance to enable all preprocessing and post-processing with model inference.

According to one or more embodiments, a multimedia inferencing pipeline may be implemented by configuring each model separately based on the underlying framework (e.g., by maintaining configuration files). A configuration file may be used to define parameters for each corresponding model and/or runtime environment on which the model is to be operated. A separate configuration file may be used to define the pipeline to manage pre-processing, inferencing, and post-processing stages of the pipeline. By keeping the configuration files separate, scalability of each model is retained.

In one or more embodiments, a pipeline may include an inference server receiving multimedia data from a source (e.g., a video source). The inference server may perform batched pre-processing of the multimedia data in a pre-processing stage. The multimedia data may be batched for the pre-processing by the inference server and/or prior to being received by the inference server. Pre-processing may include, without limitation, format conversion between color spaces, resizing or cropping, etc. The pre-processing may also include extracting metadata from the multimedia data. In at least one embodiment, the metadata may be extracted using primary inferencing. The metadata may be fed to an (e.g., object tracking) intermediate module for further pre-processing.

The multimedia data (and the metadata in some embodiments) may be provided to an inferencing stage for inferencing (e.g., primary or secondary inferencing). The multimedia data may be passed to one or more deep learning models, which can be associated with any of a number of deep learning frameworks. In one or more embodiments, one or more Application Programming Interfaces (APIs)) are used to pass the multimedia data (and the metadata in some embodiments). The API(s) may correspond to a backend inferencing server and/or service, which may manage and apply the configuration file for each deep learning model, and may perform inferencing using any number of the deep learning models in parallel. In various embodiments, the backend uses a deep learning model for inferencing based at least on configuring a runtime environment of a framework that hosts the deep learning model according to the configuration file, and executing the runtime.

Output from the models may be provided to a post-processing stage from the backend and batch post-processed into new metadata. As an example use case, post-processing may include, without limitation, performing object detection, classification, and/or segmentation, batched to include the output from each of the machine learning models. Further examples of post-processing include super resolution (e.g., recovering a High-Resolution (HR) image from a lower resolution image such as a Low-Resolution (LR) image), and/or speech processing of audio data (e.g., to extract speech to text metadata). Any number of post-processing stages, inferencing stages and/or post-processing states may be chained together in a cascading sequence to form the pipeline (e.g., as defined by the configuration data). In at least one embodiment, a post-processing stage may include attaching the metadata generated in the post-processing stage on original video frames from the multimedia data before being passed for display (e.g., in an on-screen display).

Now referring to FIG. 1A, FIG. 1A is a block diagram of an example pipelined inferencing system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software.

Figure 8:
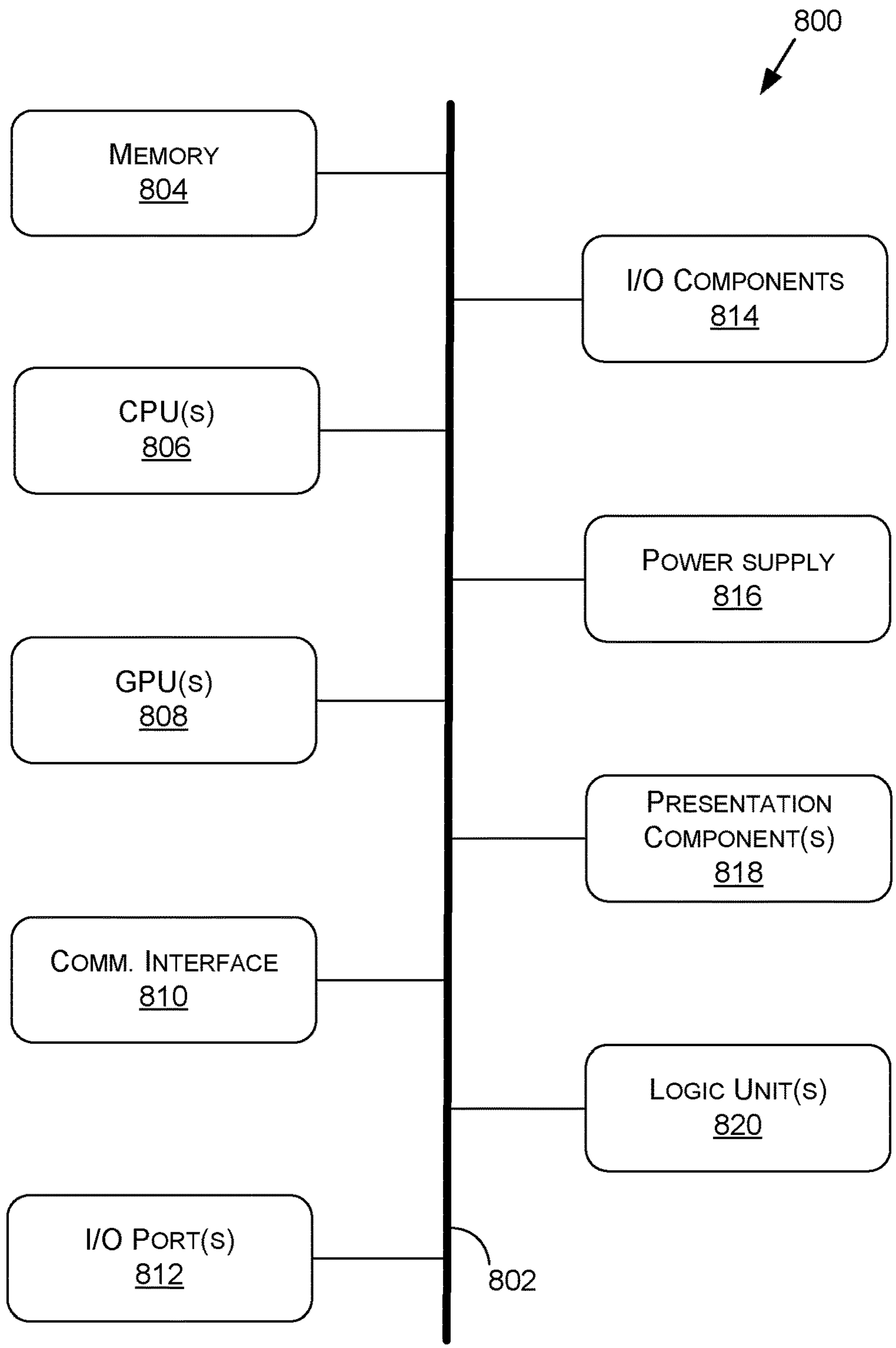
FIG. 8 is a block diagram of an example computing environment suitable for use in implementing some embodiments of the present disclosure.
Figure 9:
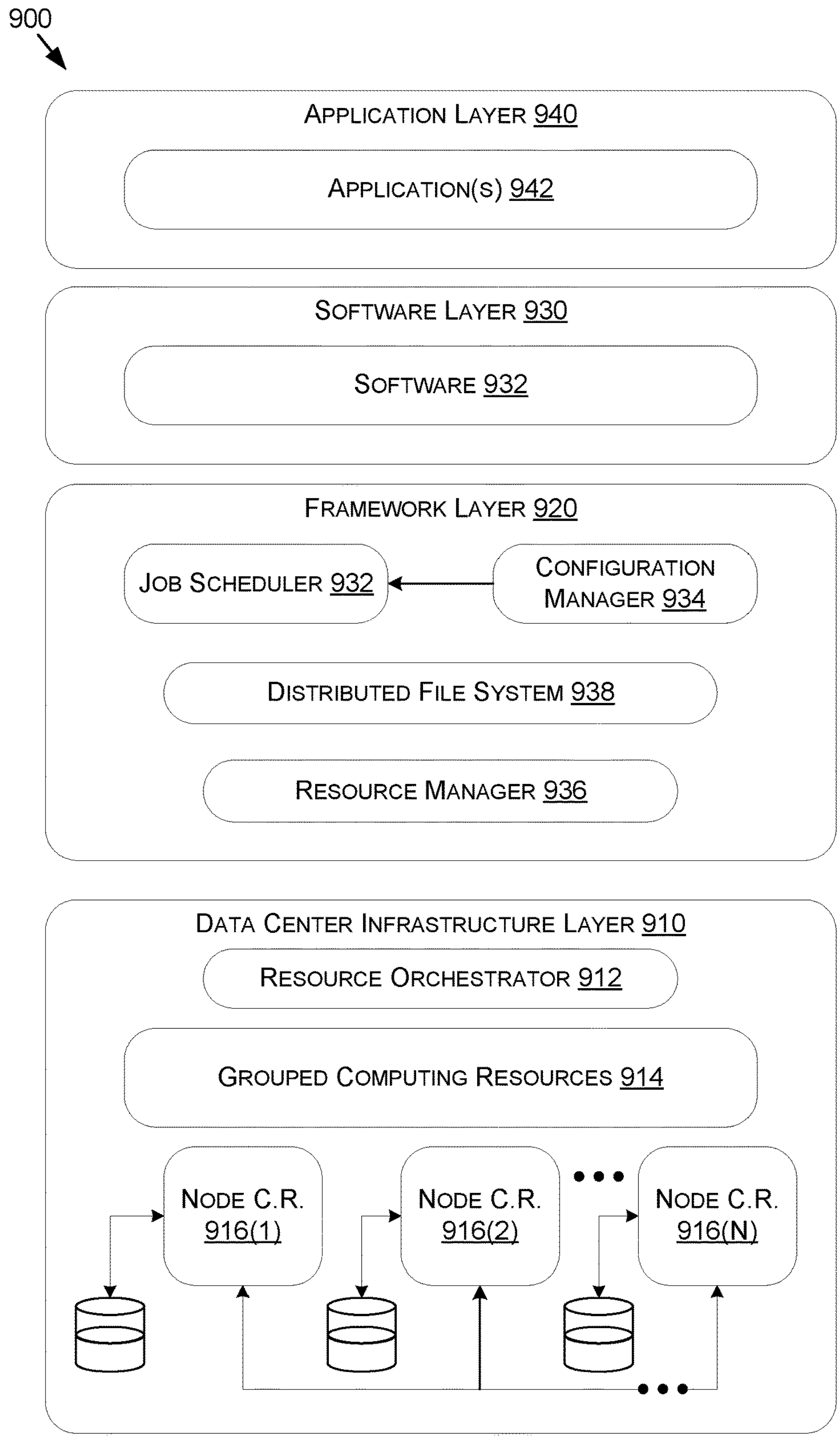
FIG. 9 is a block diagram of an example data center suitable for use in implementing some embodiments of the present disclosure.

In some embodiments, features, functionality, and/or components of the pipelined inferencing system 100 may be similar to those of computing device 800 of FIG. 8 and/or the data center 900 of FIG. 9. In one or more embodiments, the pipelined inferencing system 100 may correspond to simulation applications, and the methods described herein may be executed by one or more servers to render graphical output for simulation applications, such as those used for testing and validating autonomous navigation machines or applications, or for content generation applications including animation and computer-aided design. The graphical output produced may be streamed or otherwise transmitted to one or more client device, including, for example and without limitation, client devices used in simulation applications such as: one or more software components in the loop, one or more hardware components in the loop (HIL), one or more platform components in the loop (PIL), one or more systems in the loop (SIL), or any combinations thereof.

The pipelined inferencing system 100 may include, among other things, a pipeline manager 102, an interface manager 104, an inference server 106, an intermediate module 108, a downstream component 110, and a data store 118. The data store 118 may store, amongst other information, configuration data 120 and model data 122.

Figure 1B:
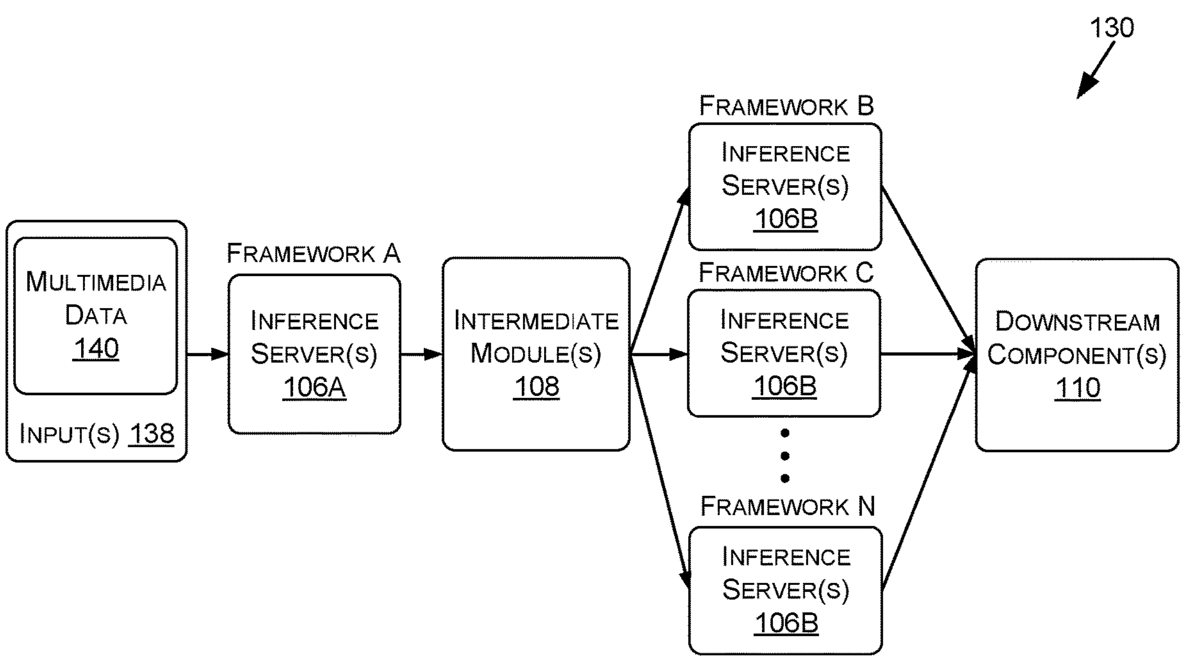
FIG. 1B is a data flow diagram illustrating an example inferencing pipeline, in accordance with some embodiments of the present disclosure.

As an overview, the pipeline manager 102 may be configured to set up and manage inferencing pipelines, such as an inferencing pipeline 130 of FIG. 1B, according to the configuration data 120. In operating an inferencing pipeline, the pipeline manager 102 may use the interface manager 104, which may be configured to manage communications between the pipelined inferencing system 100 and external components and/or between internal components of the pipelined inferencing system 100.

An inferencing pipeline may comprise, amongst other potential components, one or more of the inference servers 106, one or more of the intermediate modules 108, and one or more of the downstream components 110. An inference server 106 may be a server configured to perform at least inferencing on input data to generate output data, and may in some cases perform other data processing functions such as pre-processing and/or post-processing. An intermediate module 108 may receive input from and/or provide output to an inference server 106 and may perform a variety of potential data processing functions, non-limiting examples of which include pre-processing, post-processing, inferencing, non-machine learning computer vision and/or data analysis, optical flow analysis, object tracking, data batching, metadata extraction, metadata generation, metadata filtering, and/or output parsing. Although the intermediate module(s) 108 is shown as being external to the inference server(s) 106, in one or more embodiments, one or more intermediate modules 108 may be included in one or more inference servers 106.

FIG. 1B is a data flow diagram illustrating an inferencing pipeline 130, in accordance with some embodiments of the present disclosure. The inferencing pipeline 130 may include an inference server(s) 106A, an intermediate module (s) 108, and an inference server(s) 106B, which may be defined by the configuration data 120. In at least one embodiment, one or more downstream components 110 may also be defined by the configuration data 120 (e.g., the pipeline manager 102 may instantiate and/or route data to a downstream components 110 according to the configuration data 120).

The inferencing pipeline 130 may receive one or more inputs 138, which may comprise multimedia data 140. The multimedia data 140 may comprise one or more feeds and/or streams of video data, audio data, temperature data, motion data, pressure data, light data, proximity data, depth data, image data, ultrasonic data, sensor data, and/or other data types. For example, the multimedia data 140 may include image data, such as image data generated by, for example and without limitation, one or more cameras of a security system, an autonomous or semi-autonomous vehicle, a robot, a warehouse vehicle, a flying vessel, a boat, or a drone. In addition, in some embodiments, the multimedia data 140 includes one or more of LIDAR data from one or more LIDAR sensors, RADAR data from one or more RADAR sensors, audio data from one or more microphones, SONAR data from one or more SONAR sensors, temperature data from one or more temperature sensors, motion data from one or more motion sensors, pressure data from one or more pressure sensors, light data from one or more light sensors, proximity data from one or more proximity sensors, depth data from one or more depth sensors, ultrasonic data from one or more ultrasonic sensors and/or data derived from any combination thereof. In at least one embodiment, a stream or feed of the multimedia data 140 may be received from a device and/or sensor that generated the data (e.g., in real-time), or the data may be forwarded from one or more intermediate devices. As examples, the multimedia data 140 may comprise raw and/or pre-processed sensor data.

While the inference servers 106A and 106B are shown, in one or more embodiments, the inferencing pipeline may comprise any number of inference servers 106. An inference server 106, such as the inference server(s) 106A or the inference server(s) 106B may perform inferencing using one or more Machine Learning Models (MLMs). For example and without limitation, the MLMs described herein may include any type or combination of MLMs, such as a MLMs(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In various embodiments, the MLMs may be based on any of a variety of potential MLM frameworks. For example, the inference server(s) 106A may use one or more MLMs based on a Framework A, and the inference server(s) 106B may use MLMs based on a Framework B, a Framework C, and a Framework N to host corresponding MLMs. While different MLM frameworks are shown, in various embodiments, MLMs based on any suitable combination and number of frameworks may be included in an inferencing pipeline. An MLM framework (a software framework) may provide, for example, a standard software environment to build and deploy MLMs for training and/or inference. Suitable MLM frameworks include deep learning frameworks such as Tensorflow, Open Neural Network Exchange (ONNX), PyTorch, Caffe2, and TensorRT. In various examples, an MLM framework may comprise a runtime environment that is that operable to execute an MLM, such as an executable which may be stored in a binary file. In one or more embodiments, each runtime environment may correspond to a containerized application, such as a Docker container.

In the example of the inferencing pipeline 130, the inference server 106A may be used for primary inferencing on the multimedia data 140, and the inference server 106B may be used for secondary inferencing. The intermediate module 108 may intermediate between the primary and secondary inferencing. In at least one embodiment, this may include pre-processing, post-processing, inferencing, data batching of inputs to a subsequent pipeline stage, metadata filtering, non-machine learning computer vision and/or data analysis, optical flow analysis, object tracking, data batching, metadata extraction, metadata generation, metadata filtering, and/or output parsing. Although the intermediate module(s) 108 is shown as being external to the inference server(s) 106, in one or more embodiments, one or more intermediate modules 108 may be included, at least partially, in one or more of the inference servers 106A or 106B. Further, while two inferencing stages are shown, any number of inferencing stages and may be employed (e.g., in cascade). One or more intermediate modules may interconnect each inferencing stage.

Figure 2:
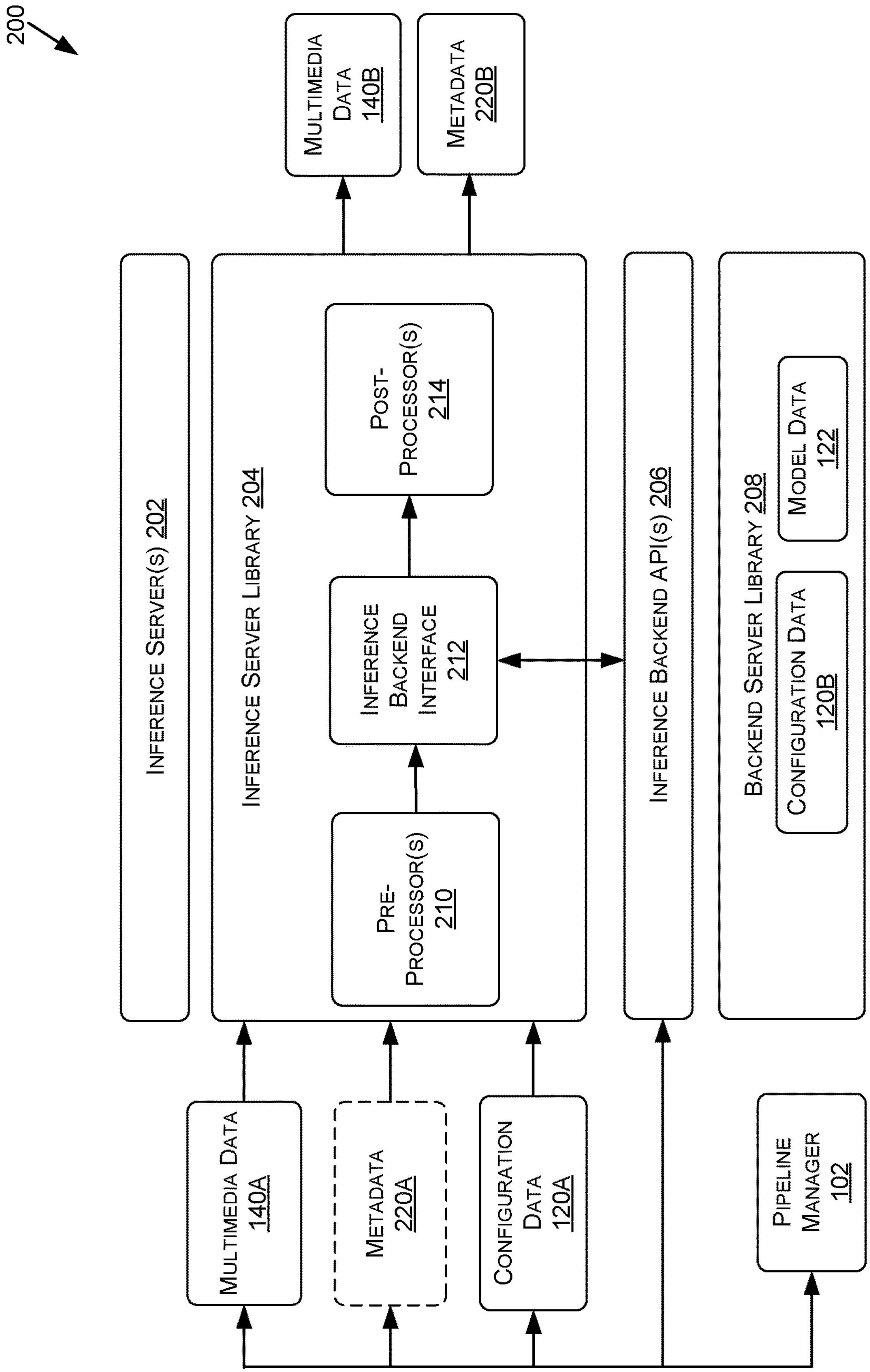
FIG. 2 is a block diagram of an example architecture implemented using an inference server, in accordance with some embodiments of the present disclosure.

Referring now to FIG. 2, FIG. 2 is a block diagram of an example architecture 200 implemented using an inference server 202, in accordance with some embodiments of the present disclosure. The inference server 106A and/or the inference server 106B may be similar to the inference server 202 of FIG. 2 (e.g., each or both may be implemented on the same or different inference server(s) 202). As shown, the architecture 200 may include an inference server library 204 implementing one or more pre-processors 210, one or more inference backend interfaces 212, and/or one or more post processors 214. The architecture 200 may further include one or more inference backend APIs 206, and one or more backend server libraries 208.

As an overview, the inference server library 204 may be invoked by the pipeline manager 102 to use configuration data—such as configuration data 120A—to set up and configure an inferencing pipeline (e.g., the inferencing pipeline 130 of FIG. 1B). The inference server library 204 may be a central inference server library that sets up and manages each stage of the inferencing pipeline. The pipeline manager 102 may further provide (e.g., make available) configuration data—such as configuration data 120B—to the backend server library 208. The backend server library 208 may use the configuration data 120B to set up and configure one or more MLMs (and one or more frameworks) represented by the model data 122. In executing the inferencing pipeline, the inference server library 204 may use the pre-processor(s) 210 to pre-process multimedia data 140A, which may correspond to the multimedia data 140 of FIG. 1A. The pre-processed multimedia data may be provided to the inference backend interface 212. The inference backend interface 212 may pass the pre-processed multimedia data and/or metadata (e.g., metadata 220A and/or metadata generated by the pre-processor(s) 210) to the backend server library 208 for inferencing. In the example shown, the inference backend interface 212 may communicate with the backend server library 208 using the inference backend API(s) 206.

The backend server library 208 may execute the MLM(s) using inputs corresponding to the multimedia data and/or metadata and provide outputs of the inferencing (e.g., raw and/or post-processed tensor data) to the inference backend interface(s) 212 (e.g., using the inference backend API(s) 206). The inference backend interface 212 may provide the outputs to the post-processor(s) 214, which post-processes the outputs (e.g., from the one or more MLMs and/or frameworks). The outputs of the post-processor(s) 214 may include, for example, metadata 220B. The inference server library 204 may provide the metadata 220B as an output and in some cases may provide the multimedia data 140B as an output. The multimedia data 140B may comprise one or more portions of the multimedia data 140A and/or one or more portions of the multimedia data 140A pre-processed using the pre-processor(s) 210. In embodiments where multiple stages of the inferencing pipeline are implemented using an inference server 202 (e.g., the inferencing pipeline 130), the multimedia data 140B may comprise or be used to generate (e.g., by an intermediate module 108) the multimedia data 140A (and/or the metadata 220A) for a subsequent inferencing stage. Similarly, the metadata 220B may comprise or be used to generate the metadata 220A for a subsequent inferencing stage.

As described herein, the inference server library 204 may be invoked by the pipeline manager 102 to use the configuration data 120—such as the configuration data 120A and the configuration data 120B—to set up and configure an inferencing pipeline (e.g., the inferencing pipeline 130 of FIG. 1B). In examples, the pipeline manager 102 may set up and configure an inferencing pipeline in response to a user selection of the inferencing pipeline and/or corresponding configuration data (e.g., a configuration file) of the inferencing pipeline in an interface (e.g., a user interface such as a command line interface). In further examples, the set up and configuration may be initiated without user selection, which may include being triggered by a system event or signal. In at least one embodiment, one or more stages of the inferencing pipeline may be implemented, at least partially, using one or more Virtual Machines (VMs), one or more containerized applications, and/or one or more host Operating Systems (OS). For example, the architecture 200 may correspond to a containerized application or the inference server library 204 and the backend server library may correspond to respective containerized applications.

In one or more embodiments, the inference server library 204 may comprise a low-level library and may set up each stage of the inferencing pipeline, which may include deploying the specified or desired MLM(s) and/or other pipeline components (e.g., the pre-processor(s) 210, the inference backend interface(s) 212, the post processors(s) 214, the interface manager(s) 104, the intermediate module(s) 108, and/or the downstream component(s) 110) defined by the configuration data 120 of the inferencing pipeline into a repository (e.g., a shared folder in a repository). Deploying a component may include loading program code corresponding to the component. For example, the inference server library 204 may load user or system defined pre-processing algorithms of the pre-processor(s) 210 and/or post-processing algorithms of the post-processor(s) 214 from runtime loadable modules. The inference server library 204 may also use the configuration data 120 to manage and set parameters for these components with respect to a variety of inference frameworks that may be incorporated into the inferencing pipeline. The configuration data 120 can define a pipeline that encompasses stages for video decoding, video transform, cascade inferencing (including, without limitation primary inferencing and multiple secondary inferencing) on different frameworks, metadata filtering and exchange between models, and display.

The configuration data 120A may comprise a portion of the configuration data 120 of FIG. 1A used to manage and set parameters for the pre-processor(s) 210, the inference backend interface(s) 212, and/or post processors(s) 214 with respect to a variety of inference frameworks that may be incorporated into the inferencing pipeline associated with the settings in the configuration data 120A (e.g., for one or more inference servers 202). In at least one embodiment, the configuration data 120A defines each stage of the inferencing pipeline and the flow of data between the stages. For example, the configuration data 120A may comprise a graph definition of an inferencing pipeline, along with nodes that correspond to components of the inferencing pipeline. The configuration data 120A may associate nodes with particular code, runtime environments, and/or MLMs (e.g., using pointers or references to the model data 122, the configuration data 120B, and/or portions thereof).

The configuration data 120A may also define parameters of the pre-processor(s) 210, the inference backend interface (s) 212, the post processors(s) 214, the interface manager(s) 104, the intermediate module(s) 108, and/or the downstream component(s) 110. For example, where the pre-processor 210 performs resizing and/or cropping of image data, the parameters may be of those operations, such as output size, input source, etc. One or more of the parameters for a component may be user specified, or may be determined automatically by the pipeline manager 102. For example, the pipeline manager 102 may analyze the configuration data 120B to determine the parameters. If the configuration data 120B defines particular MLM or framework, the parameters may automatically be configured to be compatible with that MLM or framework. If the configuration data 120B defines or specifies a particular input or output format, the parameters may automatically be configured to generate or handle data in that format.

Parameters may similarly be automatically set to ensure compatibility with other modules, such as user provided modules or algorithms that may be operated internal to or external to the inference server library 204. For example, parameters of inputs to the pre-processor 210 may be automatically configured based on a module that generated at least one of the multimedia data 140A or the metadata 220A. Similarly, parameters of outputs from the post-processor 214 may be automatically configured based on a module that is to receive at least some of the multimedia data 140B or the metadata 220B according to the configuration data 120A. Metadata may include, without limitation, object detections, classifications, and/or segmentations. For example, metadata may include class identifiers, labels, display information, filtered objects, segmentation maps, and/or network information. In at least one embodiment, metadata may be associated with, correspond to, or be assigned to one or more particular video and/or multimedia frames or portions thereof. A downstream component 110 may leverage the associations to perform processing and/or display of the multimedia data or other data based on the associations (e.g., display metadata with corresponding frames).

The configuration data 120B may comprise a portion of the configuration data 120 of FIG. 1A used to define parameters for each corresponding MLM, framework, and/or runtime environment (represented by the model data 122) on which an MLM is to be operated by the backend server library 208. The configuration data 120B may specify an MLM, or runtime environment, as well as a corresponding platform or framework, what inputs to use, the datatype, the input format (e.g., NHWC for Tensorflow, NCHW for TensorRT, etc.), the output datatype, or the output format. The backend server library 208 may use the configuration data 120B to set up and configure the one or more MLMs (and one or more frameworks) represented by the model data 122.

In at least one embodiment, the configuration data 120B may be separate from the configuration data 120A (e.g., be included in separate configuration files). As an example, the configuration file(s) may be in a language-neutral, platform-neutral, extensible format for serializing structured data, such as a protobuf text-format file. By keeping the configuration files separate, scalability of each model is retained. For example, the configuration data 120B for a MLM or runtime environment may be adjusted independently of the configuration data 120A with the inference server library 204 and the backend server library 208 being agnostic or transparent to one another. In at least one embodiment, each MLM and/or runtime environment may have a corresponding configuration file or may be included in a shared configuration file. The configuration file(s) for an MLM(s) may be associated with one or more model files and/or data structures, which may correspond to the framework of the MLM(s). Examples include Tensorflow, Open Neural Network Exchange (ONNX), PyTorch, Caffe2, or TensorRT formats.

In executing an inferencing pipeline, the pre-processor(s) 210 may perform at least some pre-processing of the multimedia data 140A. The pre-processing may include, without limitation, metadata filtering, format conversion between color spaces, datatype conversion, resizing or cropping, etc. In some examples, the pre-processor(s) 210 performs normalization and mean subtraction on the multimedia data 140A to produce image data (e.g., float RGB/BGR/GRAY planar data). The pre-processor(s) 210 may, for example, operate on or generate any of RGB, BGR, RGB GRAY, NCHW/NHWC, or FP32/FP16/INT8/UINT8/INT16/UINT16/INT32/UINT32 data. Pre-processing may also include converting metadata to appropriate formats and/or attaching portions of the metadata 220A to corresponding frames and/or units of the pre-processed multimedia data. In some cases, pre-preprocessing may include filtering or selecting metadata and associating the filtered or selected metadata with corresponding MLMs or runtime environments that use a filtered or selected portion of the metadata as input. In one or more embodiments, the pre-processing is configured (e.g., by configuring the pre-processor(s) 210) such that the pre-processed multimedia data and/or metadata is compatible with inputs to the MLM(s) used for inferencing by the backend server library 208 (implementing an inference backend).

In at least one embodiment, for each MLM that receives video data of the multimedia data 140A, the pre-processor(s) 210 converts the video data into a format that is compatible with the MLM as defined by the configuration data 120A. The pre-processor(s) 210 may similarly resize and/or crop the video data (e.g., frames or frame portions) to the input size of the MLM. As an example, where an object detector has performed object detection on the multimedia data 140, the pre-processor(s) 210 may crop one or more of the objects from the video data using the detection results. In one or more embodiments, the object detector may have been implemented using primary inferencing performed by the inference server 106A of the inferencing pipeline 130 (e.g., using an MLM executed using the backend server library 208) and the pre-processor 210 of the inference server 106B may prepare the video (and in some cases associated metadata) for secondary inferencing performed by the inference server 106B of the inferencing pipeline 130 (e.g., using an MLM executed using the backend server library 208). While video data is provided as an example, other types of data, such as audio data and/or metadata may be similarly processed.

In one or more embodiments, at least some pre-processing may occur prior to the inference server library 204 receiving the multimedia data 140A. For example, the interface manager 104 may perform transformations (e.g., format conversion and scaling) on input frames (e.g., on the inference server 202 and/or another device) based on model requirements, and pass the transformed data to the inference server library 204. In at least one embodiment, the interface manager 104 may perform further functions, such as hardware decoding of each video stream included in the multimedia data 140 and/or batching of frames of the multimedia data 140A and/or frame metadata of the metadata 220A for batched pre-processing by the pre-processor(s) 210.

Pre-processed multimedia data and/or metadata may be passed to the backend server library 208 for inferencing using the inference backend interface 212. Where the pre-processor 210 is employed, the pre-processed multimedia data (and metadata in some embodiments) may be compatible with inputs provided to the backend server library 208 that the backend server library 208 (e.g., a framework runtime environment hosting an MLM executed using the backend server library 208) uses to generate or provide at least some of the inputs to the MLM(s). In embodiments, all pre-processing of the multimedia data 140 needed to prepare the inputs to the MLM(s) may be performed by the pre-processor(s) 210, or the backend server library 208 may perform at least some of the pre-processing. Using disclosed approaches, metadata and/or raw tensor data may be used for inference understanding performed by primary and/or non-primary inferencing.

In at least one embodiment, inferencing may be implemented using the backend server library 208, which the inference server library 204 and/or the pipeline manager 102 may interface with using inference backend API(s) 206. Using this approach may allow for the inferencing backend to be selected and/or implemented independently from the overall inferencing pipeline framework, allowing flexibility in what components perform the inferencing, where inferencing is performed, and/or how inferencing is performed. For example, the underlying implementation of the inference backend may be abstracted from the inference server library 204 and the pipeline manager 102 and accessed using API calls. In other examples, the inference backend may be implemented using a service, where the interface manager 104 uses the inference backend interfaces 212 to accesses the service as a client.

The inferencing performed using the backend server library 208 may be executed on the inference server(s) 202 and/or one or more other servers or devices. The architecture 200 is sufficiently flexible to be incorporated into many different configurations. In at least one embodiment, the processing performed using the pre-processor 210, the post processor 214, and/or the backend server library 208 may be implemented at least partially on one or more cloud systems and/or at least partially on one or more edge devices. For example, the pre-processor 210, inference backend interface 212, and the post processor 214, may be implemented on one or more edge devices and the inferencing performed using the backend server library 208 may be implemented on one or more cloud systems, or vice versa. As another option, each component may be implemented on one or more edge devices, or each may be implemented on one or more cloud systems. Similarly, one or more of the intermediate module(s) 108 and/or downstream component(s) 110 may be implemented on one or more edge devices and/or cloud systems, which may be the same or different than those used for an inference server(s) 202. Where the downstream component(s) 110 comprise an on-screen display, at least presentation of the on-screen display may occur on a client device (e.g., a PC, a smartphone, a terminal, a security system monitor or display device, etc.) and/or an edge device.

The backend server library 208 may be responsible for maintaining and configuring the model data 122 of the MLM(s) using the configuration data 120B. The backend server library 208 may also be responsible for performing inferencing using the MLMs and providing outputs that correspond to the inferencing (e.g., over the inference backend API 206). In at least one embodiment, the backend server library 208 may be implemented using NVIDIA® Triton Inference Server. The backend server library 208 may load MLMs from the model data 122, which may be in local storage or on a cloud platform that may be external to the system. Inferencing performed by the backend server library 208 may be for training and/or deployment.

The backend server library 208 may run multiple MLMs from the same or different frameworks concurrently. For example, the inferencing pipeline 130 of FIG. 1B indicates that MLMs may be ran using a Framework B, a Framework C, through a Framework N. In one or more embodiments, the MLMs of the frameworks and/or portions thereof may be run in parallel using one or more parallel processor. For example, the backend server library 208 may run the MLMs on a single GPU or multiple GPUs (e.g., using one or more device work streams, such as CUDA Streams). For a multi-GPU server, the backend server library 208 may automatically create an instance of each model on each GPU.

The backend server library 208 may support low latency real-time inferencing and batch inferencing to maximize GPU/CPU/DPU utilization. Data may be provided to and/or received from the backend server library 208 using shared memory (e.g., shared GPU memory). In at least one embodiment, any of the various data of the inferencing pipeline may be exchanged between stages via the shared memory. For example, each stage may read from and write to the shared memory. The backend server library 208 may also support MLM ensembles where a pipeline of one or more MLMs and the connection of input and output tensors between those MLMs (can be used with a custom backend) are established to deploy a sequence of MLMs for pre/post processing or for use cases such which require multiple MLMs to perform end-to-end inference. The MLMs may be implemented using frameworks such as TensorFlow, TensorRT, PyTorch, ONNX or custom framework backends.

In at least one embodiment, the backend server library 208 may support scheduled multi-instance inference. The MLMs may be executed using one or more CPUs, DPUs, GPUs, and/or other logic units described herein. For example, one GPU may support one or more GPU instances and/or one CPU may support one or more CPU instances using multi-instance technology. Multi-instance technology may refer to technologies which partition one or more hardware processors (e.g., GPUs) into independent virtual processor instances. The instances may run simultaneously, for example, with each processing the MLM(s) of a respective runtime environment.

The inference server library 204 may receive outputs of inferencing from the backend server library 208. The post-processor(s) 214 may post-process the output (e.g., raw inference outputs such as tensor data) to generate post-processed outputs of the inferencing. In at least one embodiment, the post-processed output comprises metadata 220B. Output from the MLMs may be batch post-processed into new metadata and attached on video frames or portions thereof (e.g., original video frames) before being passed to the downstream component(s) 110 (e.g., for display in an on-screen display), being passed to a subsequent inferencing stage (e.g., implemented using the inference server library 204), and/or being passed to an intermediate module 108. Post-processing performed by the post-processor(s) 214 may include, without limitation, performing object detection (e.g., bounding box or shape parsing, detection clustering-methods like NMS, GroupRectangle, or DBSCAN, etc.), classification, and/or segmentation, batched to include the output from one or more of the MLMs. Users may provide custom metadata extraction and/or parsing algorithms or modules (e.g., via the configuration data and/or command line input) or system integrated algorithms or modules may be employed. In at least one embodiment, the post-processor (s) 214 may generate metadata that corresponds to multiple MLMs and/or frameworks. For example, an item or value of metadata may be generated based on the outputs from multiple frameworks.

The outputs of the backend server library 208 may be provided to one or more downstream components. For example, where the inference server 202 corresponds to the inference server 106A of FIG. 1B, one or more portions of the metadata 220B and/or the multimedia data 140B may be provided to the intermediate module(s) 108. The intermediate module(s) 108 may process the metadata 220B and/or the multimedia data 140B to generate the multimedia data 140A and/or metadata 220A as inputs to the inference server library 204 of the inference server 202 corresponding to the inference server 106B. In this way, inferencing from the inference server 106A may be used to generate inputs to the inference server 106B for further inferencing. Such an arrangement may repeat for any number of inference servers 106, which may or may not be separated by an intermediate module 108.

Examples of intermediate modules 108 include, without limitation, pre-processing, post-processing, metadata filtering (e.g., of object detections), inferencing, data batching of inputs to the pre-processor(s) 210, non-machine learning computer vision and/or data analysis, optical flow analysis, object tracking, data batching, metadata extraction, metadata generation, metadata filtering, and/or output parsing.

Figure 3:
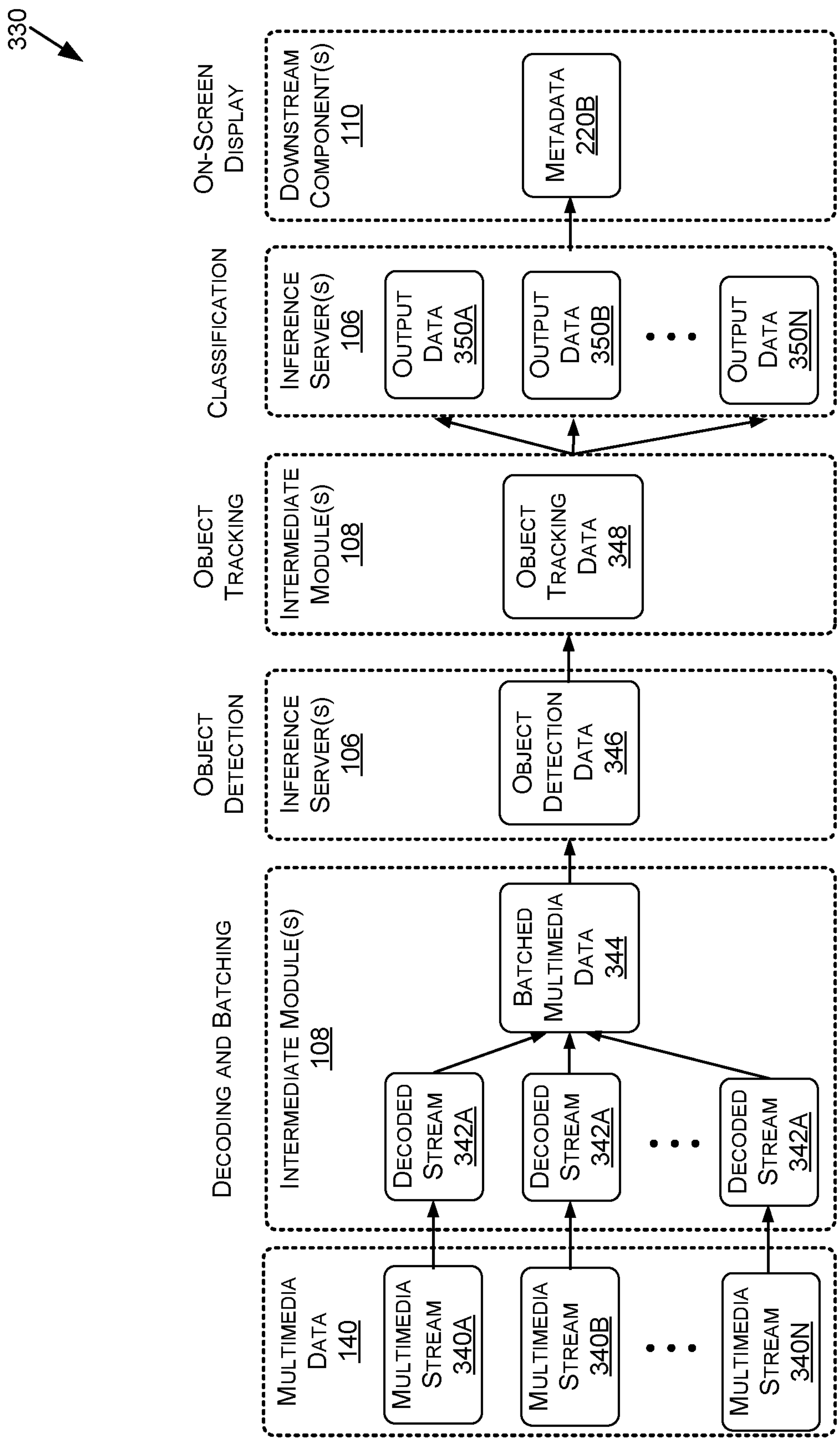
FIG. 3 is a data flow diagram illustrating an example inferencing pipeline for object detection and tracking, in accordance with some embodiments of the present disclosure.

Referring now to FIG. 3, FIG. 3 is a data flow diagram illustrating an example inferencing pipeline 330 for object detection and tracking, in accordance with some embodiments of the present disclosure. The inferencing pipeline 330 may correspond to the inferencing pipeline 130 of FIG. 1B. The multimedia data 140 received by the inferencing pipeline 330 may include any number of multimedia streams, such as multimedia streams 340A and 340B through 340N (also referred to as multimedia streams 340). The multimedia streams 340 may include streams of multimedia data from one or more sources, as described herein. By way of example and not limitation, each multimedia stream 340 may comprise a respective video stream (e.g., of a respective video camera). The intermediate module(s) 108 are configured to perform decoding of each video stream to produce decoded streams 342A and 342B through 342N. The decoding may comprise hardware decoding and may be performed at least partially in parallel using one or more GPUs, CPUs, DPUs, and/or dedicated decoders (where an audio only stream is provided the audio may similarly be hardware decoded). The video streams may be in different formats and may be encoded using different codecs or codec versions. As an example, the multimedia stream 340A may include an H.265 video stream, the multimedia stream 340B may include an MJPEG video stream, and the multimedia stream 340N may include an RTSP video stream. In at least one embodiment, the intermediate module(s) 108 may decode the video streams to a common format. For example, the format may comprise an RGB/NV12 or other color format.

The intermediate module(s) 108 may also be configured to perform batching of the decoded streams 342, for example, by forming batches of one or more frames from each stream to generate batched multimedia data 344. The batches may have a maximum batch size, but a batch may be formed prior to reaching that size, for example, after a time threshold is exceeded depending on the timing of frames being received from the streams. In at least one embodiment, the intermediate module(s) 108 may store the batched multimedia data 344 in shared device memory of the inference server(s) 106. In examples, buffer batching may be employed and may include batching a group of frames into a buffer (e.g., a frame buffer) or surface. In embodiments, the shared device memory may be used to pass data between each stage of the inferencing pipeline 330.

The inference server(s) 106 may receive the batched multimedia data 344 and may use one or more MLMs to perform object detection on the frames of the batched multimedia data 344 to generate the object detection data 346. In at least one embodiment, the batched multimedia data 344 may first be processed by the pre-processor(s) 210 or the pre-processor(s) 210 may not be employed. In some examples, the pre-processor(s) 210 may perform the decoding and/or the batching rather than an intermediate module 108.

The object detection may be performed, for example, by a runtime environment (e.g., implementing a single framework) executed using the backend server library 208. The object detection data 346 may include the metadata 220B generated using the post-processor(s) 214, which may generate the metadata 220B from tensor data output from the runtime environment. As an example, the metadata 220B for a frame may include locations of any number of objects detected in the frame, such as bounding box or shape coordinates and in some cases associated detection confidence values. The metadata 220B for the frame may be attached, assigned, or associated with the frame. In embodiments, the post-processor(s) 214 may filter out object detection results below a threshold size and/or confidence, unnecessary classes, etc.

The intermediate module(s) 108 may receive the object tracking data 348 (e.g., with the frames) and perform object tracking based on the object tracking data 348 to generate the object tracking data 348 (using an object tracker of the intermediate module of the intermediate module 108). The tracking may, for example, be implemented using an object tracker comprising non-MLM or neural network based computer vision. In examples, the object tracking may use object detections from the object detection data 346 to assign detections to currently tracked object, newly tracked objects, and/or previously tracked objects (e.g., from a previous frame or frames). Each tracked object may be assigned an object identifier and object identifiers may be assigned to particular detections and/or frames (e.g., attached to frames).

The object identifier may be associated with metadata inferred from objects in one or more previous frames. For a vehicle that may include car color, car make, The inference server(s) 106 may receive the object tracking data 348 and may use one or more MLMs to perform object classification on the frames and/or objects of the object tracking data 348 to generate the output data 350A and 350B through 350N. In at least one embodiment, the object tracking data 348 may correspond to the multimedia data 140A and the metadata 220A of FIG. 2, and the pre-processor(s) 210 may prepare the multimedia data 140A and/or the metadata 220A for input to each MLM, framework, and/or runtime environment employed by the inference server(s) 106 for object classification. As an example, the output data 350A may be produced by a TensorRT model, the output data 350B may be produced by an ONNX model, and the output data 350N may be produced by a PyTorch model. For one or more of the MLMs, the pre-processor(s) 210 may crop and/or scale object detections from frame image data to use as input to the MLM(s).

The MLMs used to generate the output data 350A and 350B through 350N may include MLMs trained to perform different inference tasks, or one or more MLMs may perform similar inference tasks according to a different model architecture and/or training algorithm. In at least one embodiment, the output data 350A and 350B through 350N from each MLM may correspond to a different classification of the objects. For example, the output data 350A may be used to predict a vehicle model, the output data 350B may be used to predict a vehicle color, and the output data 350N may be used to predict a vehicle make. The classifications may be with respect to the same or different objects. For example, one MLM may classify animals in a frame, whereas another MLM may classify vehicles in the frame.

The output data 350A and 350B through 350N may be provided to the post-processor(s) 214, which may perform post processing on the output data 350A and 350B through 350N. For example, the post-processor(s) 214 may determine class labels or other metadata that may be included in the metadata 220B. The post-processor(s) 214 may attached and/or assign the metadata to corresponding frames or portions thereof included in the multimedia data 140B. The inference server library 204 may provide the metadata 220B to the downstream component(s) 110, which may use the metadata 220B for on-screen display. This may include display of video frames with overlays identifying locations or other metadata of tracked objects.

The present disclosure provides high flexibility in the design and implementation of inferencing pipelines. For example, with respect to any of the various documents that are incorporated by reference herein, the inferencing and/or metadata generation may be implemented using any suitable combination of components of the pipelined inferencing system 100 of FIG. 1A. As an example, different MLMs may be implemented on any combination of different runtime environments and/or frameworks. Further, metadata generation may be accomplished using any combination of the various components herein, such as a post-processor(s) 214, an intermediate module(s) 108, a pre-processor(s) 210, etc.

Figure 4:
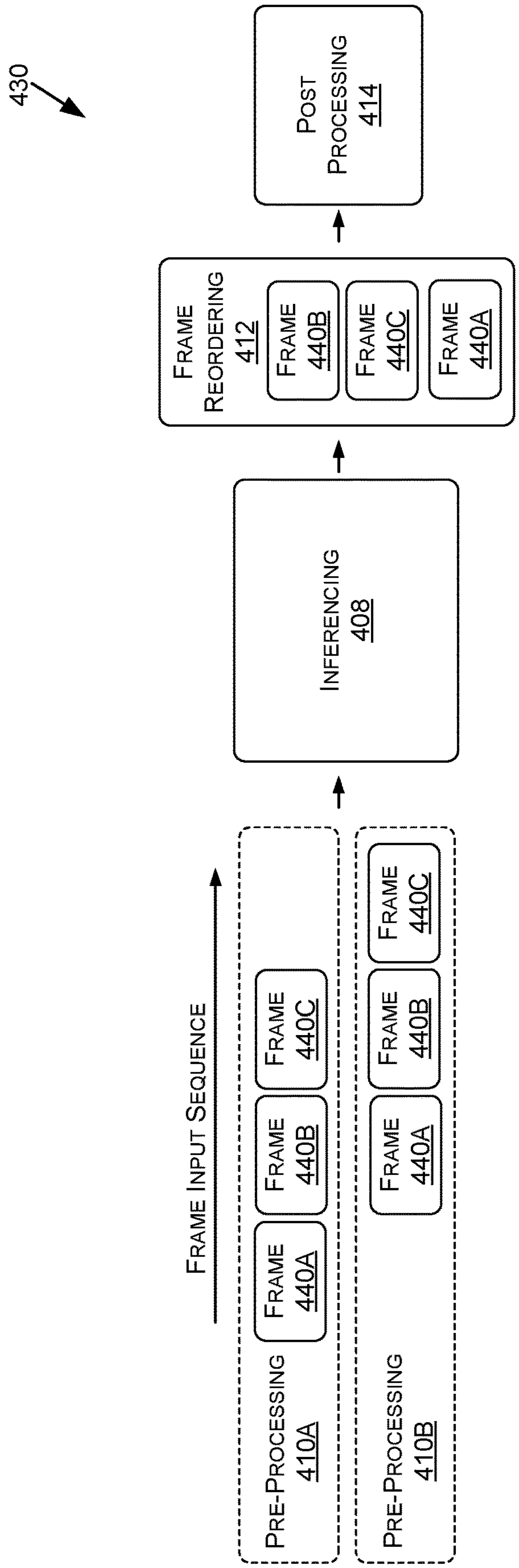
FIG. 4 is a data flow diagram illustrating an example of batched processing in at least a portion of an inferencing pipeline, in accordance with some embodiments of the present disclosure.

Referring now to FIG. 4, FIG. 4 is a data flow diagram illustrating an example of batched processing in at least a portion of an inferencing pipeline 430, in accordance with some embodiments of the present disclosure. The inferencing pipeline may correspond to at least a portion of the inferencing pipeline 130 of FIG. 1B or the inferencing pipeline 330 of FIG. 3. In at least one embodiment, the inferencing pipeline 430 corresponds to a portion of an inferencing pipeline through components of the architecture 200 of FIG. 2. The pre-processor(s) 210 may perform pre-processing using one or more pre-processing streams, which may operate, at least partially, in parallel. For example, pre-processing 410A may correspond to one of the pre-processing streams and pre-processing 410B may correspond to another of the pre-processing streams. By way of non-limiting example, the pre-processing 410A may include cropping, resizing, or otherwise transforming image data. The pre-processing 410B may include operations performed on the transformed image data, such as to customize the image data to one or more MLMs and/or frameworks. For example, the pre-processing 410B may convert a transformed image into a first data type for input to a first framework for inferencing and/or a second data type for input to a second framework for inferencing.

The pre-processing 410A may operate on frames prior to the pre-processing 410B. For example, after the pre-processing 410A occurs on frame 440A, the pre-processing 410B may be performed on the frame 440A. Additionally, while the pre-processing 410A is performed on a frame 440B (e.g., a subsequent frame), the pre-processing 410B may be performed of the frame 440A. Pre-processing may be performed on frame 440C similar to the frames 440A and 440B as indicated in FIG. 4. In at least one embodiments, the pre-processing may occur across stages in sequence. The frames may refer to frames of the video streams and/or buffer frames of a parallel processor, such as a GPU, formed using buffer batching (e.g., a buffer frame may include image data from multiple video streams). The pre-processing may be performed using threads and one or more device work streams, such as CUDA Streams.

The pre-processed frames may be passed to the backend server library 208 for inferencing 408 (e.g., using the shared memory). In at least one embodiment, a batch of frames may be sent to the backend server library 208 for processing. The batches may have a maximum batch size (e.g., three frames), but a batch may be formed prior to reaching that size, for example, after a time threshold is exceeded depending on the timing of frames being received from the streams. As described herein, scheduled multi-instance inference may be performed to increase performance levels. However, this may result in inferencing being completed for the frames out of order. To account for the disorder, frame reordering 412 may be performed on the output frames (e.g., using the backend server library 208). In at least one embodiment, buffers (e.g., a size of the batch size) may be used for the frame reordering 412 so that post-processing 414 may be performed in order using the post processor(s) 214.

Figure 5:
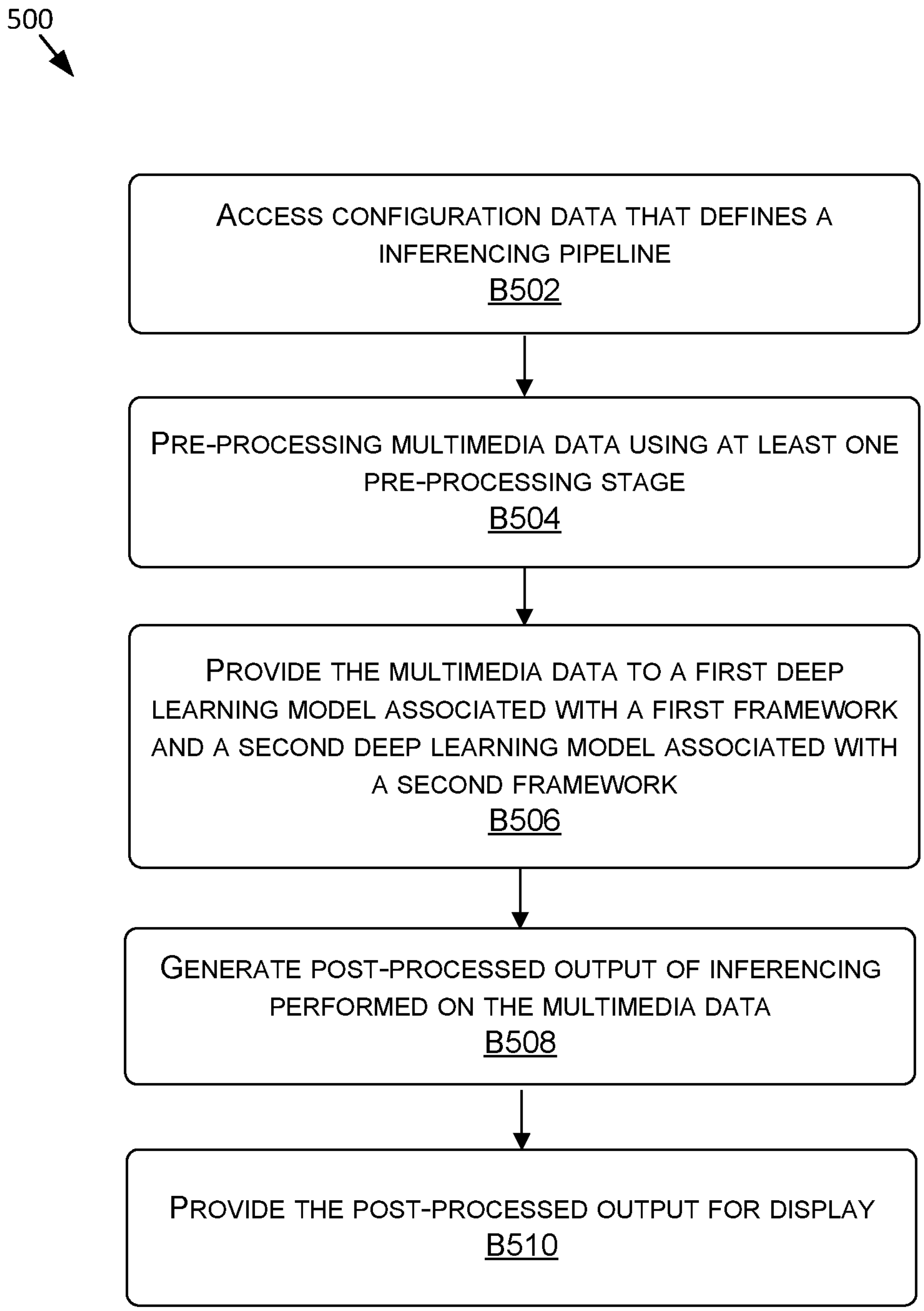
FIG. 5 is a flow diagram showing an example of a method for using configuration data to execute an inferencing pipeline with machine learning models hosted by different frameworks performing inferencing on multimedia data, in accordance with some embodiments of the present disclosure.
Figure 6:
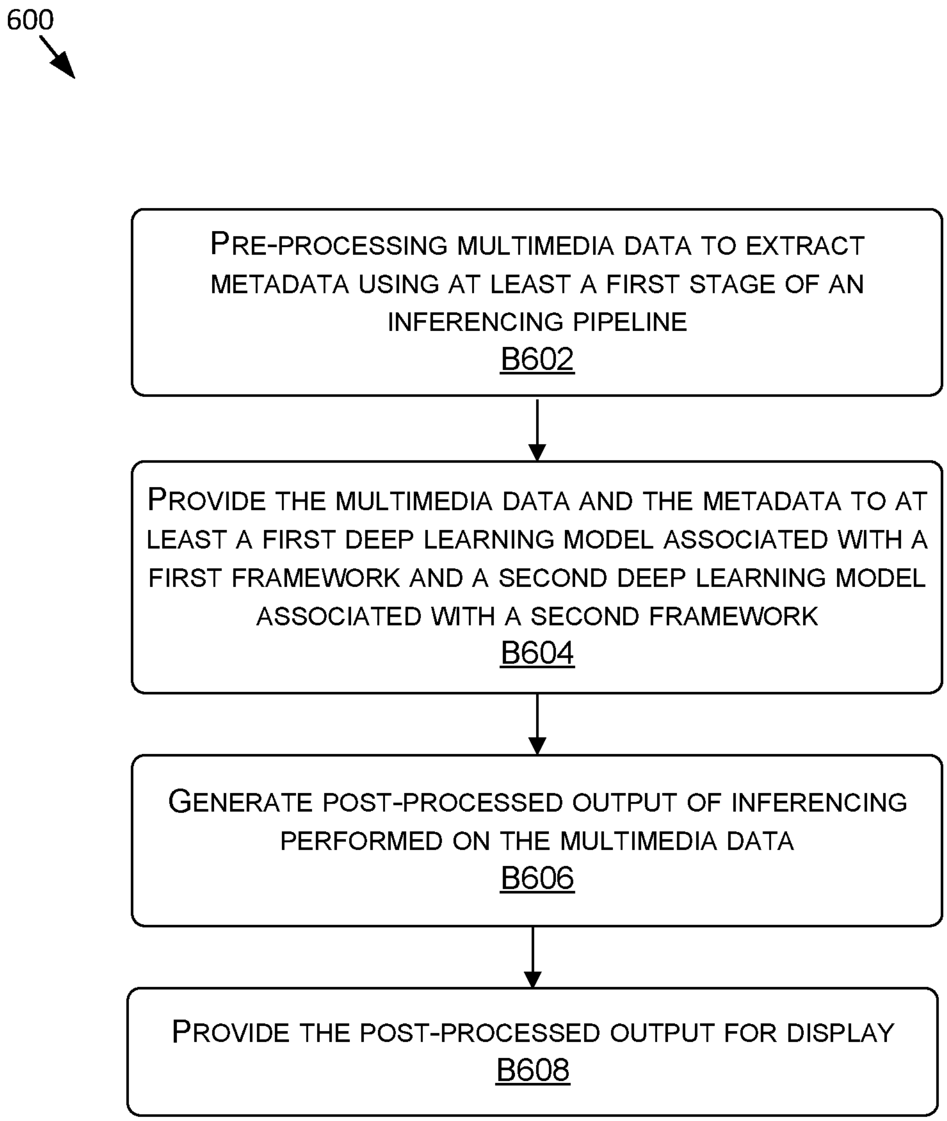
FIG. 6 is a flow diagram showing an example of a method for executing an inferencing pipeline with machine learning models hosted by different frameworks performing inferencing on multimedia data and metadata, in accordance with some embodiments of the present disclosure.
Figure 7:
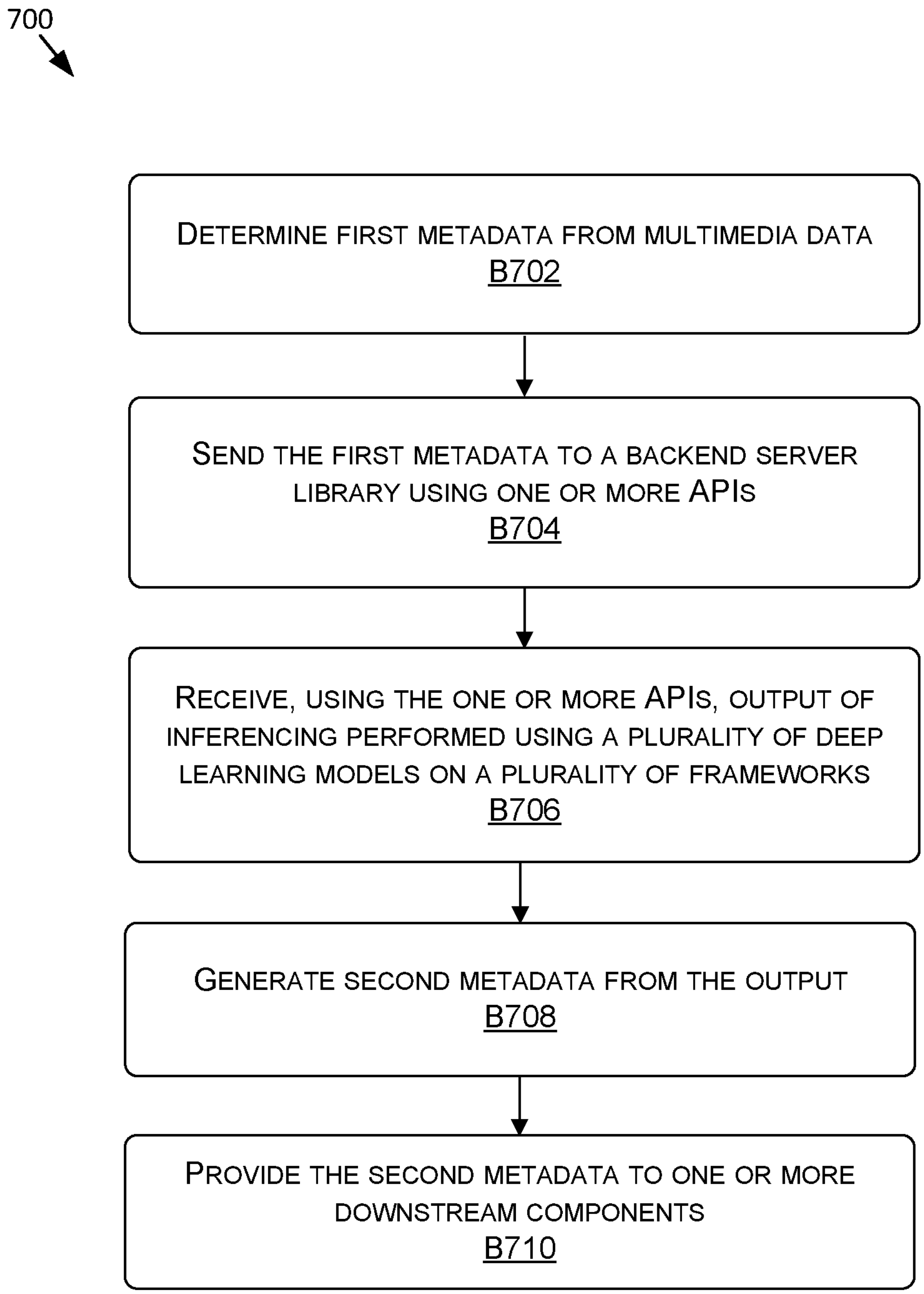
FIG. 7 is a flow diagram showing an example of a method for executing an inferencing pipeline using different frameworks that receive metadata using one or more APIs, in accordance with some embodiments of the present disclosure.

Now referring to FIGS. 5-7, each block of methods 500, 600, and 700, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the pipelined inferencing system 100 (FIG. 1). However, these methods may additionally or alternatively be executed by any one system, or any combination of systems, including, but not limited to, those described herein.

FIG. 5 is a flow diagram showing an example of a method 500 for using configuration data to execute an inferencing pipeline with machine learning models hosted by different frameworks performing inferencing on multimedia data, in accordance with some embodiments of the present disclosure.

The method 500, at block B502, includes accessing configuration data that defines an inferencing pipeline. For example, the pipeline manager 102 may access the configuration data 120 that defines stages of the inferencing pipeline 130, where the stages include at least one pre-processing stage, at least one inferencing stage, and at least one post-processing stage.

The method, at block B504, includes pre-processing multimedia data using at least one pre-processing stage. For example, the inference server library 204 may pre-process the multimedia data 140A using the pre-processor 210 (and/or an intermediate module 108).

The method, at block B506, includes providing the multimedia data to a first deep learning model associated with a first framework and a second deep season model associated with a second framework. For example, the pre-processor 210 may provide the multimedia data 140A to the backend server library 208 after the pre-processing, which may provide the pre-processed multimedia data 140A to a first deep learning model hosted by the Framework B and a second deep learning model hosted by hosted by the Framework C.

The method, at block B508, includes generating post-processed output of performed on the multimedia data. For example, the post-processor 214 may generate post-processed output of inferencing, where the inferencing was performed on the multimedia data 140A using the deep learning models.

The method, at block B508, includes providing the post-processed output for display by an on-screen display. For example, the inference server library 204 may provide the metadata 220B and/or the multimedia data 140B to a downstream component 110 for on-screen display.

FIG. 6 is a flow diagram showing an example of a method 600 for executing an inferencing pipeline 130 with machine learning models hosted by different frameworks performing inferencing on multimedia data and metadata, in accordance with some embodiments of the present disclosure.

The method 600, at block B602, includes pre-processing multimedia data to extract metadata. For example, the pre-processor 210 (and/or an intermediate module 108) may pre-process the multimedia data 140A to extract metadata.

The method 600, at block B604, includes providing the multimedia data and the metadata to a plurality of deep learning models of the inferencing pipeline 130, the plurality of deep learning models including at least a first deep learning model associated with a first framework and a second deep learning model associated with a second framework. For example, the pre-processor 210 may provide the multimedia data 140A and the metadata to a plurality of deep learning models of the inferencing pipeline 130. The plurality of deep learning models may include at least a first deep learning model associated with Framework B and a second deep learning model associated with a framework C.

The method 600, at block B606, includes generating post-processed output of inferencing performed on the multimedia data. For example, the post processor 214 may generate post-processed output of inferencing performed on the multimedia data using the plurality of deep learning models and the metadata.

The method 600, at block B606, includes providing the post-processed output for display by an on-screen display. For example, the inference server library 204 may provide the metadata 220B and/or the multimedia data 140B to a downstream component 110 for on-screen display.

FIG. 7 is a flow diagram showing an example of a method 700 for executing the inferencing pipeline 130 using different frameworks that receive metadata using one or more APIs, in accordance with some embodiments of the present disclosure.

The method 700, at block B702, includes determining first metadata from multimedia data. For example, the inference server(s) 106A and/or the intermediate module(s) 108 may determine the metadata 220A for the inference server(s) 106B using at least one deep learning model of a first runtime environment.

The method 700, at block B704, includes sending the first metadata to a backend server library using one or more APIs. For example, the inference backend interface(s) 212 may send the metadata 220A to the backend server library 208 using the inference backend API(s) 206. The backend server library 208 may execute a plurality of deep learning models including at least a first deep learning model on a second runtime environment that corresponds to a first framework and a second deep learning model on a third runtime environment that corresponds to a second framework.

The method 700, at block B706, includes receiving, using the one or more APIs, output of inferencing performed on the multimedia data using a plurality of deep learning models. For example, the inference backend interface(s) 212 may receive, using the inference backend API(s) 206, output of inferencing performed on the multimedia data 140 using the plurality of deep learning models and the metadata 220A.

The method 700, at block B708, includes generating second metadata from the output. For example, the post-processor(s) 214 may generate the metadata 220B from at least a first portion of the output of the second runtime environment and a second portion of the output from the third runtime environment.

The method 700, at block B710, includes providing the second metadata to one or more downstream components. For example, the inference server library 204 may provide the metadata 220B to the downstream component(s) 110.

Example Computing Device

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as “workstation,” “server,” “laptop,” “desktop,” “tablet,” “client device,” “mobile device,” “hand-held device,”

"game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 807 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Tensor Cores (TCs), Tensor Processing Units(TPUs), Data Processing Units (DPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Example Data Center

FIG. 9 illustrates an example data center 900, in which at least one embodiment may be used. In at least one embodiment, data center 900 includes a data center infrastructure layer 910, a framework layer 920, a software layer 930 and an application layer 940.

In at least one embodiment, as shown in FIG. 9, data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs"), any number of data processing units ("DPUs"), or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-916(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory or storage resources that may be configured or allocated to support one or more workloads. In at least one embodiment, several node C.R.s including CPUs, DPUs, GPUs, or other processors may grouped within one or more racks to provide compute resources to support one or more workloads. In at least one embodiment, one or more racks may also include any number of power modules, cooling modules, and network switches, in any combination.

In at least one embodiment, resource orchestrator 922 may configure or otherwise control one or more node C.R.s 916(1)-916(N) and/or grouped computing resources 914. In at least one embodiment, resource orchestrator 922 may include a software design infrastructure ("SDI") management entity for data center 900. In at least one embodiment, resource orchestrator may include hardware, software or some combination thereof.

In at least one embodiment, as shown in FIG. 9, framework layer 920 includes a job scheduler 932, a configuration manager 934, a resource manager 936 and a distributed file system 938. In at least one embodiment, framework layer 920 may include a framework to support software 932 of software layer 930 and/or one or more application(s) 942 of application layer 940. In at least one embodiment, software 932 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. In at least one embodiment, configuration manager 934 may be capable of configuring different layers such as software layer 930 and framework layer 920 including Spark and distributed file system 938 for supporting large-scale data processing. In at least one embodiment, resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. In at least one embodiment, resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

In at least one embodiment, data center 900 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 900. In at least one embodiment, trained machine learning models corresponding to one or more neural networks may be used to infer or predict information using resources described above with respect to data center 900 by using weight parameters calculated through one or more training techniques described herein.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

analyzing configuration data that specifies stages of an inferencing pipeline using a representation of a flow of data across the inferencing pipeline, the stages comprising a first stage including one or more first deep learning models in a first runtime environment of a first deep learning framework, a second stage including one or more second deep learning models in a second runtime environment of a second deep learning framework, and an intermediate stage interconnecting the first runtime environment and the second runtime environment;

based at least on the analysis, identifying, in the configuration data, an indicator of an input data format that is compatible with the second deep learning framework;

based at least on the identified indicator, selecting one or more parameters that configure the intermediate stage to format input to the one or more second deep learning models in the input data format, the input generated using the intermediate stage from output comprising inference data generated by the one or more first deep learning models processing multimedia data;

using the configuration data and the selected one or more parameters, configuring the first runtime environment, the second runtime environment, and the intermediate stage;

generating, by the intermediate stage post-processing the inference data in accordance with being configured by the selected one or more parameters, the input having the input data format;

routing, using the representation of the flow of data from the configuration data, the multimedia data to the first runtime environment, the output to the intermediate stage, and the input to the second runtime environment to effectuate the flow of data across the inferencing pipeline; and displaying the multimedia data on an on-screen display using metadata of the multimedia data, the metadata generated using the inferencing pipeline.

2. The method of claim 1, wherein the configuring includes a central server library loading the first runtime environment on a first instance of a backend server library, the second runtime environment on a second instance of the backend server library, and the intermediate stage on the central server library, and the central server library performs the routing.

3. The method of claim 2, wherein the configuring includes the central server library providing a first configuration file to the first instance which causes the first instance to use the first configuration file to set up the one or more first deep learning models using the first configuration file, and the central server library providing a second configuration file to the second instance which causes the second instance to use the second configuration file to set up the one or more second deep learning models using the second configuration file.

4. The method of claim 1, wherein the first deep learning framework and the second deep learning framework comprise different deep learning frameworks selected from a group consisting of TensorFlow, Caffe2, PyTorch, ONNX, and TensorRT.

5. The method of claim 1, wherein the first runtime environment is a first containerized environment and the second runtime environment is a second containerized environment.

6. The method of claim 1, wherein the input data format comprises at least one of a tensor layout, a datatype format, a numeric precision, a channel order, or a serialization format.

7. The method of claim 1, wherein at least one processing operation executed during the intermediate stage is hardware-accelerated, and the at least one processing operation comprises at least one of:

decoding of the multimedia data;

converting the multimedia data from a first multimedia format to a second multimedia format; or resizing one or more units of the multimedia data.

8. The method of claim 1, wherein the multimedia data comprises a sequence of frames, the first stage generates the output for the sequence of frames out of order, and the intermediate stage reorders the sequence of frames and performs the post-processing on the sequence of frames in-order, the post-processing producing frame metadata included in the input.

9. The method of claim 1, wherein the selecting of the one or more parameters is from parameters corresponding to a plurality of potential input data formats for the input and at least one of the potential input data formats is incompatible with the second deep learning framework and the one or more second deep learning models.

10. The method of claim 1, wherein at least one processing operation performed during the intermediate stage comprises at least one of:

performing object detection;
performing object classification;
performing class segmentation;
performing super resolution processing; or
performing language processing of audio data.

11. The method of claim 1, wherein the inference data comprises tensor data having a first tensor layout, the input data format comprises a second tensor layout, and the generating of the input includes the intermediate stage converting the tensor data from the first tensor layout to the second tensor layout.

12. A method comprising:

analyzing configuration data that specifies stages of an inferencing pipeline using a representation of a flow of data across the inferencing pipeline, the stages comprising a first stage including one or more first deep learning models in a first runtime environment of a first deep learning framework, a second stage including one or more second deep learning models in a second runtime environment of a second deep learning framework, and an intermediate stage interconnecting the first runtime environment and the second runtime environment;

based at least on the analysis, identifying, in the configuration data, an indicator of an input data format that is compatible with the second deep learning framework;

based at least on the identified indicator, selecting one or more parameters that configure the intermediate stage to format input to the one or more second deep learning models in the input data format, the input generated using the intermediate stage from output comprising inference data generated by the one or more first deep learning models processing multimedia data;

using the configuration data and the selected one or more parameters, configuring the first runtime environment, the second runtime environment, and the intermediate stage;

generating, by the intermediate stage post-processing the inference data in accordance with being configured by the selected one or more parameters, the input having the input data format;

routing, using the representation of the flow of data from the configuration data, the multimedia data to the first runtime environment, the output to the intermediate stage, and the input to the second runtime environment to effectuate the flow of data across the inferencing pipeline; and providing metadata of the multimedia data for display by an on-screen display, the metadata generated using the inferencing pipeline.

13. The method of claim 12, wherein the input is provided to a backend inferencing server during the intermediate stage using one or more Application Programming Interfaces (APIs), and the backend inferencing server uses the input to execute the one or more second deep learning models.

14. The method of claim 12, wherein the metadata comprises data corresponding to at least one of:

one or more class-identifiers;
one or more labels;
display information;
one or more filtered objects;
one or more segmentation maps;
network information; or
one or more tensors representing raw sensor output.

15. The method of claim 12, wherein the output is filtered into multiple portions during the intermediate stage to generate the input to the one or more second deep learning models and second input to one or more third deep learning models.

16. The method of claim 12, wherein the configuring includes:

providing, using the configuration data, a first configuration file to a first server, causing the first server to use the first configuration file to configure the first stage; and providing, using the configuration data, a second configuration file to a second server, causing the second server to use the second configuration file to configure the intermediate stage and the second stage.

17. A system comprising:

one or more hardware processors to cause performance of an inferencing pipeline, the performance comprising:

analyzing configuration data that specifies stages of an inferencing pipeline using a representation of a flow of data across the inferencing pipeline, the stages comprising a first stage including one or more first deep learning models in a first runtime environment of a first deep learning framework, a second stage including one or more second deep learning models in a second runtime environment of a second deep learning framework, and an intermediate stage interconnecting the first runtime environment and the second runtime environment;

based at least on the analysis, identifying, in the configuration data, an indicator of an input data format that is compatible with the second deep learning framework;

based at least on the identified indicator, selecting one or more parameters that configure the intermediate stage to format input to the one or more second deep learning models in the input data format, the input generated using the intermediate stage from output comprising inference data generated by the one or more first deep learning models processing multimedia data;

using the configuration data and the selected one or more parameters, configuring the first runtime environment, the second runtime environment, and the intermediate stage;

generating, by the intermediate stage post-processing the inference data in accordance with being configured by the selected one or more parameters, the input having the input data format;

routing, using the representation of the flow of data from the configuration data, the multimedia data to the first runtime environment, the output to the intermediate stage, and the input to the second runtime environment to effectuate the flow of data across the inferencing pipeline; and providing metadata of the multimedia data for display by an on-screen display, the metadata generated using the inferencing pipeline.

18. The system of claim 17, wherein the inferencing pipeline further includes a third stage corresponding to a third deep learning framework that is different than the first deep learning framework and the second deep learning framework.

19. The system of claim 17, wherein the first stage corresponds to an object detector used to detect objects and the second stage includes an object classifier used to classify one or more of the objects.

20. The system of claim 17, wherein the first stage corresponds to an object detector to generate object detections and the metadata is generated using an object tracker that operates on the object detections.

21. The system of claim 17, wherein the system corresponds to at least one of:

a control system for an autonomous or semi-autonomous machine;

a perception system for an autonomous or semi-autonomous machine;

a system for performing simulation operations;

a system for performing deep learning operations;

a system implemented using an edge device;

a system implemented using a robot;

a system incorporating one or more Virtual Machines (VMs);

a system implemented at least partially in a data center; or a system implemented at least partially using cloud computing resources.

* * * * *